United States Patent [19]

Wagner

[11] 4,292,007
[45] Sep. 29, 1981

[54] FASTENER AND WASHER ASSEMBLY

[75] Inventor: David P. Wagner, Geneva, Ill.

[73] Assignee: Illinois Tool Works Inc., Chicago, Ill.

[21] Appl. No.: 92,150

[22] Filed: Nov. 7, 1979

[51] Int. Cl.³ .......................................... F16B 39/26
[52] U.S. Cl. ..................................... 411/156; 411/533
[58] Field of Search ............... 151/38, 37; 10/155 A; 411/156, 533

[56] References Cited

U.S. PATENT DOCUMENTS

| | | | |
|---|---|---|---|
| 1,945,005 | 1/1934 | Vacher | 151/38 |
| 2,192,322 | 3/1940 | Mitchell | 151/37 X |
| 2,303,224 | 11/1942 | Olson | 10/155 A X |
| 3,037,221 | 6/1962 | Lanius, Jr. | 10/10 R |
| 3,163,196 | 12/1964 | Hannemann | 151/37 |
| 3,628,584 | 12/1971 | Gutshall | 151/38 |
| 3,856,066 | 12/1974 | Reynolds | 151/38 |
| 4,179,976 | 12/1979 | Sygnator | 85/47 |

FOREIGN PATENT DOCUMENTS 700878  1/1966  Italy ...................................... 151/38

*Primary Examiner*—Ramon S. Britts
*Attorney, Agent, or Firm*—Richard K. Thomson; Thomas W. Buckman

[57] ABSTRACT

A preassembled domed washer and fastener that can be snapped together after thread rolling and heat treatment. The inner periphery of the washer is reduced in thickness to provide flexibility and the fastener is provided with an interrupted annular ledge. The flexibility of the washer's inner periphery permits it to yield as it is pushed over the ledge and to snap back into engagement. The knurling or other interrupting of the ledge insures that large slivers from the case hardened fastener which cause handling problems and may reduce the amount of interference to the point the washer can fall off, are not formed.

4 Claims, 5 Drawing Figures

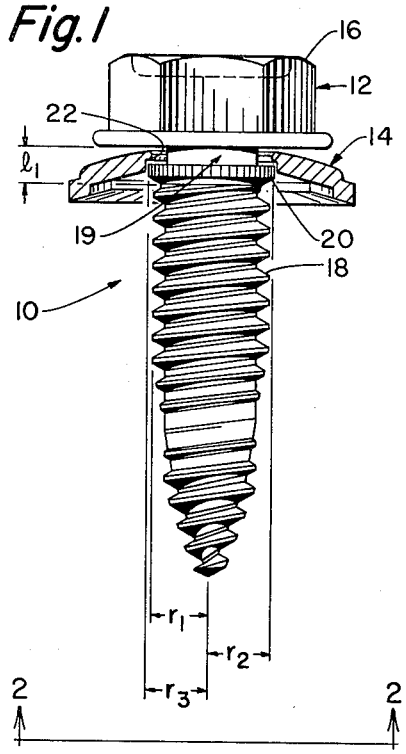
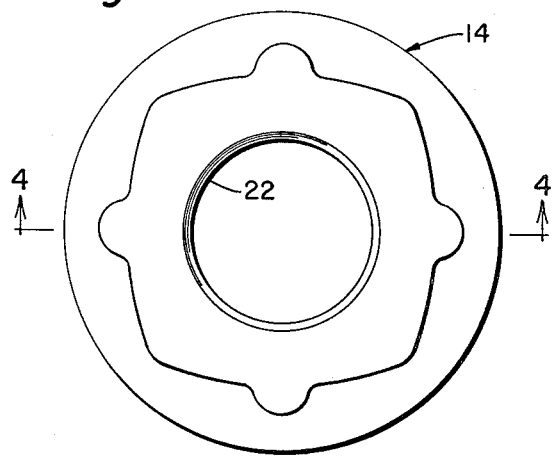
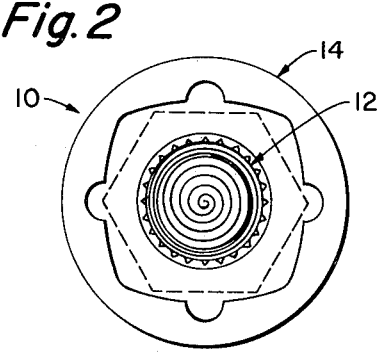
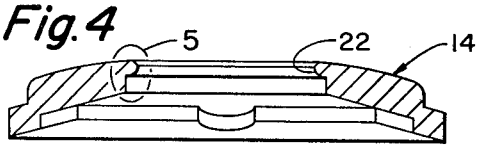
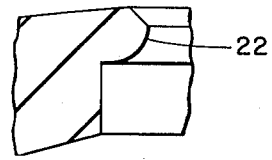

FASTENER AND WASHER ASSEMBLY

BACKGROUND AND SUMMARY OF THE INVENTION

The present invention relates to a preassembled fastener and washer assembly.

Prior art assemblies of this type have been generally formed by assembling the washer to the fastener followed by a thread rolling step. While this technique and assembly have proved effective with some applications, there are instances where this method and assembly are unsuitable. For example, when used with a domed or stand-off type washer this technique prevents that portion of the fastener surrounded by the washer from being threaded. In those applications where the assembly is to be used with a thin workpiece, the inner periphery of the aperture may have a tendency to be drawn up underneath the washer. In the prior art assemblies, absence of threads in this region may lead to the stripping of the threads in the workpiece or other failure of the joint.

Related applications include U.S. Ser. No. 932,744 and Ser. No. 6,956. In an effort to overcome the problems created by an absence of threads in the upper region of the fastener, the teachings of the above-noted application Ser. No. 932,744 were applied. That is, attempts were made to assemble the washer and fastener after thread rolling. In this particular application, however, it is desirable to case harden the threads of the fastener while maintaining the flexibility of the washer. In order to do this, a heavy copper plate must be applied to the washer prior to heat treating and stripped off after the heat treatment. In addition to the cost involved in such a process, problems include the fact that once the copper is stripped away, the inside diameter of the washer is enlarged and occasionally permits the washer to become disassembled from the fastener. A further attempt was made to overcome these problems by heat treating the fastener first and then assembling the washer. However, problems arose in this instance due to the fact that the annular ring on the fastener had been case hardened and when the washer was pushed thereover, a sliver generally broke off the ring, again, allowing the washer to fall off.

It is therefore an object of the present invention to provide a domed washer and fastener assembly in which the fastener is threaded in that region which is surrounded by the washer.

It is a further object of the present invention to provide an assembly which may be put together following heat treatment thereby eliminating the expensive copper plating method previously utilized.

These and other objects of the invention are accomplished by providing a washer and fastener assembly in which the fastener has an unthreaded region which includes an interrupted annular ledge. The washer has an aperture for receiving the fastener with a diameter which is greater than the thread crest diameter but less than the diameter of the interrupted annular ledge. The inner periphery of the aperture has been coined in order to reduce the thickness of material in this region. This increases the flexibility of the inner periphery of the washer allowing it to be sprung over the interrupted annular ledge by merely pushing the washer thereover. The interrupted annular ledge is formed as a knurled ring. In this fashion, if there is any tendency of the washer to wipe away material from this hardened knurled ring, only minute particles will be removed, thereby insuring sufficient interference between the coined edge and the annular ledge to guarantee retention of the washer on the fastener.

These and other objects, advantages and features of the invention will be more fully understood by reading the following specification in conjunction with the drawings which form a part thereof.

BRIEF DESCRIPTION OF THE DRAWINGS

FIG. 1 is a side elevational view in partial section of the fastener and washer assembly of the present invention;

FIG. 2 is an end view taken along line 2—2 of FIG. 1;

FIG. 3 is an enlarged plan view of the washer of the present invention;

FIG. 4 is a side elevational view in section taken along line 4—4 of FIG. 3; and FIG. 5 is an enlarged cross sectional view of that portion of the washer's inner periphery which is encircled in FIG. 4.

DETAILED DESCRIPTION OF THE INVENTION

As best shown in FIG. 1, the fastener and washer assembly of the present invention is shown generally at 10. The assembly comprises a headed threaded fastener 12 and a domed or conical washer 14. Fastener 12 has a hexagonal head 16 and a self-tapping thread 18 which may, for example, be of the type shown and disclosed in co-pending application Ser. No. 883,061. The upper extremity of thread 18 is spaced from the lower extremity of head 16 by a distance $l_1$ forming an unthreaded region indicated generally at 19. This unthreaded region includes an interrupted annular ledge 20 which may take the form of a knurled ring. The ledge 20 may be formed simultaneously in a thread rolling process with the threads 18 or in a subsequent thread rolling step.

The washer 14 of the present invention may be of the type shown and described in U.S. Pat. No. 3,856,066 which is herein incorporated by reference. Even though this particular washer configuration has been shown in conjunction with this disclosure, it will be understood that the teachings of this invention apply equally well to any domed washer. The inner periphery 22 of washer 14 has been coined in order to reduce the thickness of the material in this region. The inner periphery is thereby made more flexible, such that it may spring over interrupted annular ledge 20. The inner periphery 22 has a radius $r_2$, which is greater than the thread crest radius $r_1$, but less than $r_3$, the radius of annular ledge 20.

Before assembling the component fastener 12 and washer 14 into the assembly 10 of the present invention, these elements may be heat treated as their respective characteristics require. In order to interconnect the components into the final assembly 10, it is merely necessary to push the washer along the shank of the fastener 12 until the inner periphery 22 engages the interrupted annular ledge 20. Flexibility provided inner periphery 22 by its reduced thickness permits it to yield as it passes the interrupted annular ledge 20 and spring back to effect engagement. Any tendency of the annular ledge 20 to be wiped away by the inner periphery 22 will be minimized, both by the flexibility of the inner periphery, and the interruptions which have been formed on the ledge 20. The knurling or interrupting of the ledge has the effect of eliminating this slivering which accompanied some attempts to eliminate this problem. At worst, the present invention merely breaks off a few particles from the crest of each knurl. In this manner there is sufficient interference between the inner periphery 22 of the washer and the interrupted ledge 20 to insure that the washer will remain assembled with the fastener. In addition, the fastener of the present invention is capable of improved performance due to the fact that there are threads 18 within the dome of the washer. While the invention has been described in conjunction with specific embodiments thereof, many alternatives, modifications and variations will become apparent in light of the foregoing specification. Accordingly, it is intended that the present invention embrace all such alternatives, modifications and variations as fall within the spirit and scope of the independent claims.

I claim:

1. A preassembled fastener and washer assembly comprising a threaded fastener including an enlarged head, said fastener having a shank with a helical thread which has a predetermined maximum thread crest diameter, the upper extremity of the fastener threads being spaced a predetermined distance from the lower extremity of the head thereby defining an unthreaded portion, said unthreaded portion including an annular ledge; a domed washer having an inner and an outer periphery which define a predetermined axial length, said length being such that when the washer's inner periphery is in abutment with the lower extremity of the fastener head, the outer periphery of the washer extends beyond the unthreaded portion such that the domed washer encloses at least one convolution of a fully formed thread, said washer having a fastener receiving hole therein which has a diameter greater than the thread crest diameter but less than the diameter of the annular ledge whereby said washer is held captive on the fastener by said annular ledge, the inner periphery of said hole being reduced in thickness from that of the standard washer thickness in order to increase the flexibility of the inner periphery so that it may be sprung over the annular ledge to form the assembly.

2. The assembly of claim 1 wherein the annular ledge is interrupted.

3. The assembly of claim 2 wherein the interrupted annular ledge comprises a knurled ring.

4. The assembly of claim 2 wherein that portion of the unthreaded shank of the fastener which is not occupied by the interrupted annular ledge has a length which exceeds the thickness of the reduced inner thickness of the washer.

* * * * *